UNITED STATES PATENT OFFICE.

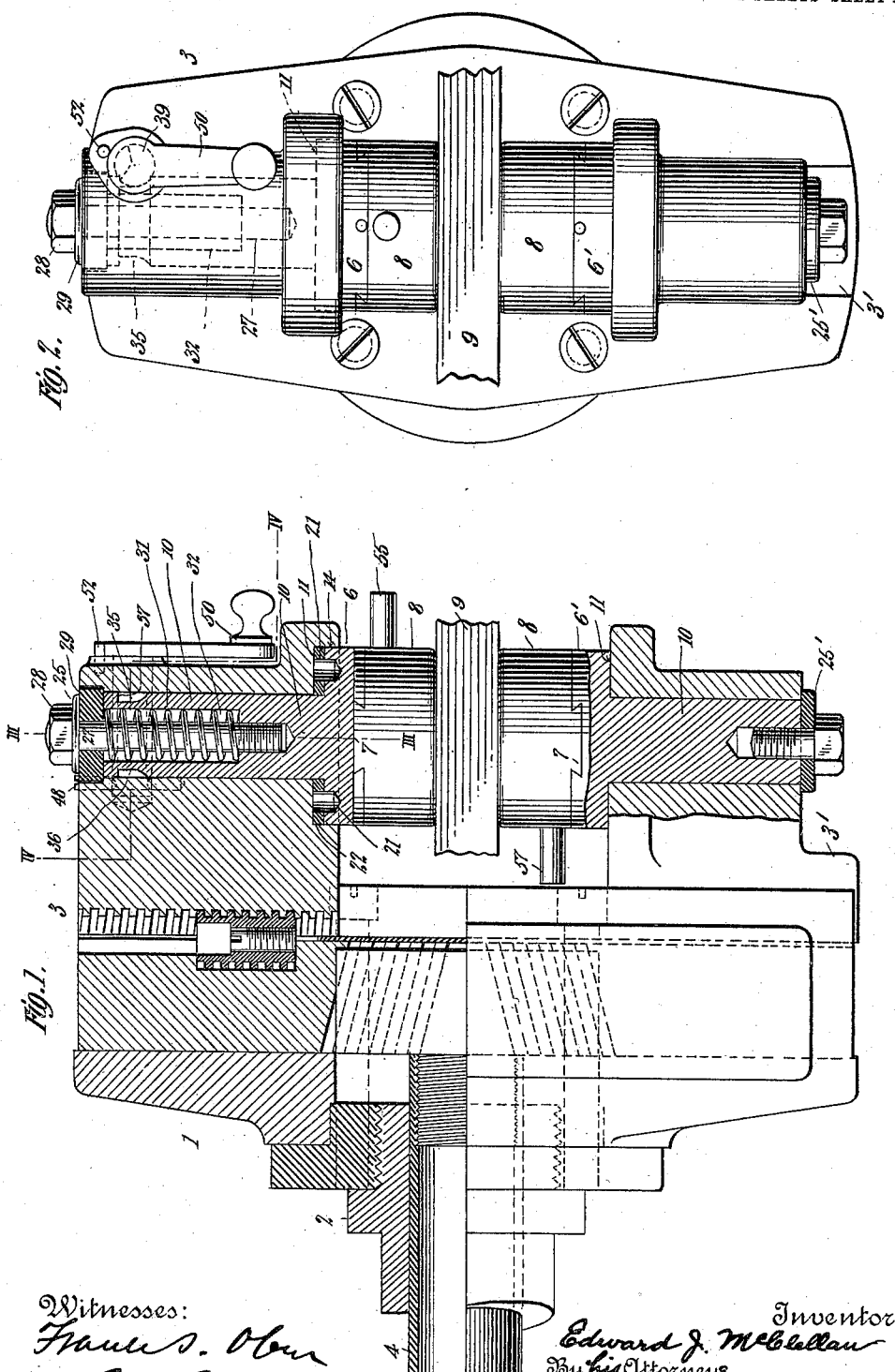

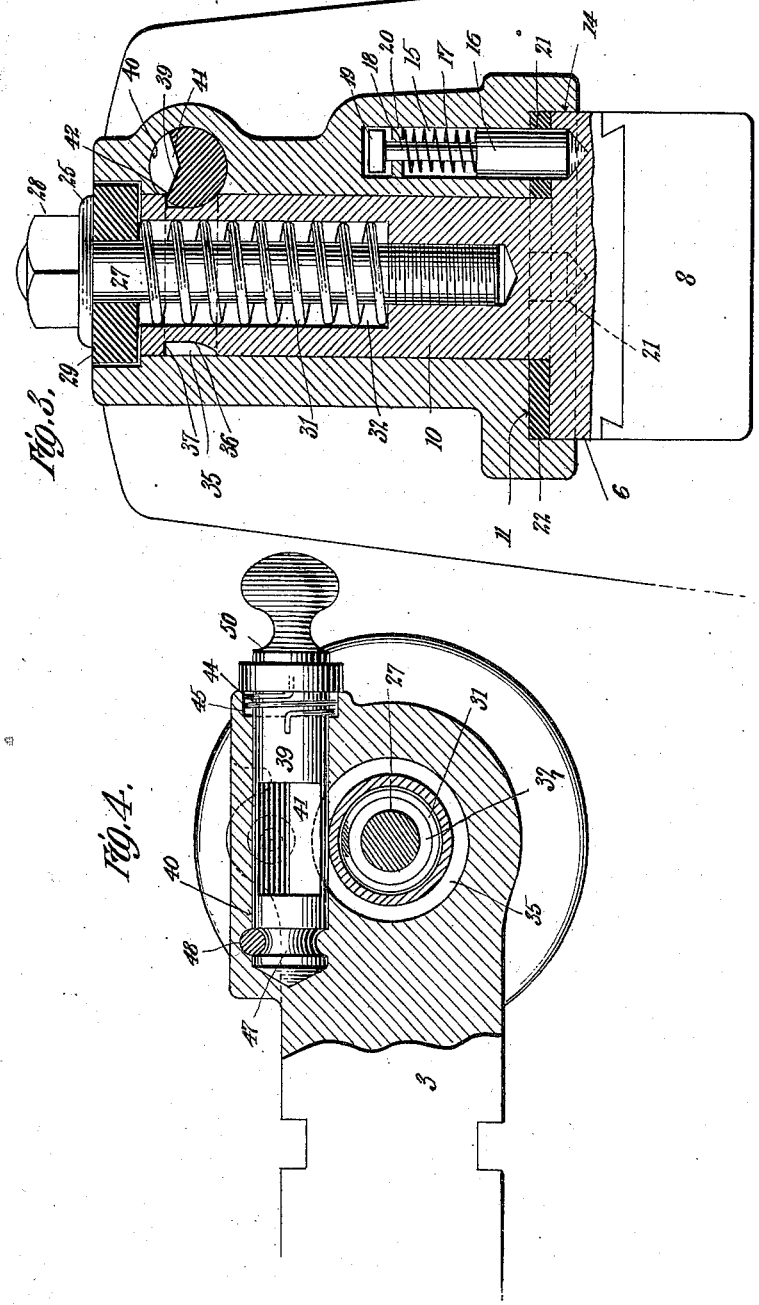

EDWARD J. McCLELLAN, OF NEW YORK, N. Y., ASSIGNOR TO THE GARVIN MACHINE COMPANY, A CORPORATION OF NEW YORK.

INDEXING-CHUCK.

983,918.  Specification of Letters Patent. Patented Feb. 14, 1911.

Application filed June 14, 1909. Serial No. 501,950.

*To all whom it may concern:*

Be it known that I, EDWARD J. McCLELLAN, a citizen of the United States, residing at the city of New York, in the borough of Manhattan and State of New York, have invented certain new and useful Improvements in Indexing-Chucks, of which the following is a full, clear, and exact description.

This invention relates to a chuck for monitor lathes and other purposes, particularly where there is a draw tube or its equivalent for simultaneously tightening the jaws of the chuck upon the work.

The present chuck is designed primarily for manufacturing processes where a considerable number of pieces or parts of the same general shape are required to be successively machined in a lathe, and in which holes or other machining is required in a plurality of different directions all radial to a single axis within the work. As examples of the foregoing, there may be mentioned stop cocks, pet cocks, and other piping fixtures with holes at right-angles to one another and in the same or parallel planes.

A type of chuck known as an indexing chuck has been proposed for the foregoing use or purpose, and having jaws with swiveled heads adapted to clamp the work on a rotatable diametral axis of the chuck.

My present invention relates to this indexing type of chuck and includes features by which the chuck jaws are clamped under certain circumstances with great pressure upon the work, at which time they are locked against the swiveling movement above referred to. At other times the chuck jaws bear on the work with light pressure, sufficient to prevent the work from dropping out of the chuck or loosening out of adjustment, but the arrangement is such as to permit the chuck jaws to swivel for the indexing purposes at this time, and is also adapted to permit a manual separation of the jaws for the purpose of removing and replacing the work. As will later appear, I accomplish this result by the use of a supplemental spring, acting on one of the chuck jaws to give the latter a movement independent of the movement which is imparted from the draw tube or similar source of main clamping pressure. The supplemental spring is however adapted to be thrown out of action and its jaw withdrawn by a hand lever or crank. As will also later appear, the index mechanism has certain features by which it initially assists the positioning of the jaws when they are swiveled as above described, and is adapted thereafter to definitely fix the adjustment of the jaws and lock them.

With the foregoing and other objects in view my invention consists in the features of construction and combination as hereinafter set forth and claimed.

In the drawings: Figure 1 is a side view, partly in section, of an indexing chuck embodying the principles of my invention. Fig. 2 is an end view of the same. Fig. 3 is a sectional view on the line III—III of Fig. 1. Fig. 4 is a section on the line IV—IV of Fig. 1.

Referring to the drawings in which like parts are designated by the same reference sign, 1 denotes the frame or body of the chuck, which is adapted to be threaded or otherwise attached to the nose of a lathe spindle 2. The chuck has jaws or jaw supporting blocks 3, 3' movable toward one another by the action of a draw tube 4 or its equivalent. The particular mechanism by which the jaws 3, 3' are made to approach and recede from one another by the action of the draw tube or its equivalent, is immaterial for the purposes of the present invention and may be of any desired character. A convenient form is that illustrated and which forms the subject of a companion application Serial No. 495,837, filed May 14, 1909.

The jaws 3, 3' have swiveled heads 6, 6' therein, these heads being rotatably received within the separate jaws in axial alinement with one another. Each head has a dovetail interior face 7 adapted to receive a false jaw 8, having any special configuration to suit any particular piece of work 9. In case the work 9 is a stop cock, for example, the false jaws 8 will be grooved so as to form a sort of two-part mold to embrace the work in a fixed and uniform relation in all cases. I form the swiveled heads 6, 6' of the respective jaws with elongated stems or shanks 10. Or from another standpoint the heads may be said to be flanged or enlarged adjacent to their faces 7 to a diameter equal to that of the false jaws 8, each flange having a flat rear face or shoulder 11 which abuts against the corresponding jaw 3. The pressure of the clamping action from the jaws is transmitted through these shoulders 11 to the false jaws 8 to the work 9. The jaw 3 has a counterbored recess 14 therein adapted to receive a portion of the flange of the corresponding head 6.

15 designates a hole drilled in the jaw 3 in a direction parallel to the axis of the head 6 and extending inward from one side of the counterbore 14.

16 denotes a pin or plunger slidable in the hole or recess 15, and spring-pressed outward by the spring 17. This pin has a stem 18 having, in turn, a head or enlargement 19 adapted to abut against a partition 20 in the cavity so as to limit the outward movement of the pin 16. The shoulder 11 is drilled inward with a plurality of holes 21 which are adapted to be rotated into alinement with the pin 16, so that the latter is impelled by its spring to enter such holes 21.

22 designates a hardened plate forming a part of the head 6 and through which the holes 21 extend, this plate serving to prevent undue wear in use. It will be seen that the lower end of the pin 16 is coned or beveled. This not only facilitates the entry of the pin into its holes 21, but also secures an additional function, as later described.

In accordance with my present invention, the head 6 is movable radially through a limited distance independent of its supporting jaw 3. This movement is permitted to occur or not at the pleasure of the operator. For certain kinds of work it is not desirable to have the head 6 move independently of the jaws 3, and in these cases such movement is prevented by the collar 25, forming part of the head 6, being secured thereto by a long bolt 27, and a nut 28. This collar works against a cap 29 which may be considered as forming part of the jaw 3. The nut 28 and collar 25 are adapted to be removed whenever desired, thereby permitting a free radial movement of the head 6 within its jaw 3.

31 denotes a coil spring which is received within a cylindrical cavity 32 of the head 6, this cavity extending axially through the greater length of the shank 10 thereof. This spring 31 bears against the cap 29 previously mentioned and normally impels the head 6 inward.

35 indicates a circumferential groove around the shank 10 having a curved bottom 36 terminated by an outer side face or shoulder 37. This groove is designed to coöperate with a rock-shaft 39 which is journaled in a hole 40 of the jaw 3 in a direction generally tangent to the groove 35. The rock-shaft 39 has a cut out segment 41 on one side, thereby producing an edge or shoulder 42 which is adapted to bear against the shoulder 37 of the head 6. These shoulders are maintained in this relation by a spiral spring 44, which surrounds a portion of the rock-shaft 39 within a cavity 45 of jaw 3. The ends of this spring 44 are, of course, respectively connected to the jaws 3 and to the rock-shaft 39. The rock-shaft 39 has a groove 47 at one end in which is tangentially received a pin 48 which is screwed in the jaw 3 so as to limit endwise movement and prevent withdrawal of said rock-shaft.

50 designates a crank extending from the exposed or projecting end of this rock-shaft by which it is tilted or oscillated on its axis. By virtue of the spring 44 and the engagement of the shoulders 42, 37, which is maintained by said spring, the crank 50 oscillates with the movement of the head 6, remaining in the radial position shown when the head 6 is pressed against the jaw, but swinging outward when the head 6 moves inward from the jaw. The outward movement of the crank 50 is limited by a pin 52 which correspondingly limits the inward movement of the head 6 in its jaws. At this limit of inward movement of the head 6, the pin 16 is substantially withdrawn from the openings 21 so that the head is free to swivel on its axis. The lower conical end of the pin projects slightly, however, into the openings 21 acting in the manner of a click or detent to assist the positioning of the head. It is evident that the head 6 may be swiveled around on its axis, by the exercise of a slight force, past the conical projecting end of this pin 16, but the snapping of the pin into the holes is an indication to the operator when the proper positions of adjustment are reached.

55 denotes an arm or handle forming a part of the head 6 for conveniently swiveling it in the above manner. The lower head 6′ is provided with a similar arm or handle 57.

The use and operation is as follows: Assuming that the chuck is mounted on a lathe spindle having a draw tube as shown, and that work having two or more machined holes in different directions is required, the operator releases the draw tube 4 and holds the crank 50 pressed inward. The release of the draw tube 4 separates the chuck jaws 3, that is to say, the chuck jaws are moved from the position shown in Fig. 1 to positions farther outward, the separation being greater than the length of the protruding portion of the pin 16. It being assumed that the nut and the collar 25 are removed at this time, the head 6 is evidently free to move inward keeping in contact with the work, but as just mentioned, is displaced outward against its spring by the act of the operator who presses on the crank 50 at this time. The work 9 being inserted, the operator releases the crank 50 which permits the head 6 to move inward under the action of its impelling spring 31. The work is thus lightly clamped and held in a fixed position between the respective false jaws 8. If the draw tube 4 is now tightened, the chuck jaws 3 are brought together and this pressure being very greatly in excess of that of the spring 31, overpowers said spring, the jaws setting themselves firmly against the shoulders 11 of the respective heads 6, 6'. At the same time the false jaws are brought into correspondingly firm engagement with the work and everything is tight and firm for the drilling or other machining processes. It will be observed that the pin 16 is projected into one of the openings 21 at this time, since the depth of its containing cavity 15 is not sufficient for the said pin to yield backward more than the certain limited distance, sufficiently limited to insure the projecting of said pin into a hole 21 by the above clamping action. As soon as this first drilling or machining operation is completed the draw tube is released, again separating the chuck jaws 3. This causes the head 6 to be simultaneously projected by its spring, thereby keeping in uninterrupted contact with the work. Thus the adjustment of the work is not disturbed, and the work is in no event liable to fall out as has been the case with prior indexing chucks. Since the head 6 automatically projects itself from the jaw 3, the pin 16 is at the same time withdrawn from its hole 21, although as previously mentioned the conical end of this pin is designed to remain protruding slightly into said hole 21 under these circumstances. The operator may now swivel the head 6 on its axis, the pin 16 clicking from hole to hole as the head is rotated. The lower head 6' naturally follows the rotation of the upper head on account of the engagement of the work which is spring held between the two heads as already described. If desired, the lower head may have a separate spring locking pin, although this is not essential. After a quarter turn or any other angle of swiveling movement, as desired, dependent upon the requirements of the work and the available separation of the holes 21, the work is brought into a new position. The draw tube is then tightened and the foregoing actions repeated as many times as desired. The work always stays in place regardless of these swiveling movements until it is voluntarily removed by the action of the operator who presses the crank 50 inward while the jaws 3, 3' are separated. It will be observed that the crank 50 works equally well at all angular positions of adjustment of the head 6, on account of the circumferential groove 35 which, of course, presents the same character of engagement to the rock-shaft at all positions. The most prominent features of the construction are therefore the spring following up of the work by the jaw 6, and the means by which this following up movement can be manually retarded or reversed to permit the removal of the work.

What I claim, is:—

1. A chuck having jaws movable diametrically thereof, a pair of heads swiveled in said jaws, means within one of said heads for impelling it inward independently of its supporting jaw, and a part, movable about an axis, having means for engaging said head to retract the same, said means being operable when the jaws are in operative position.

2. A chuck having jaws movable diametrically thereof, a pair of heads swiveled in said jaws, means within one of said heads for impelling it inward independently of its supporting jaw, a part movable about an axis, having means for engaging said head to retract the same and operable when the jaws are in operative position and an automatic indexing member for locating the position of said head in both its extended and withdrawn positions.

3. A chuck having jaws movable diametrically thereof, a pair of heads swiveled in said jaws, means within one of said heads for impelling it inward independently of its supporting jaw, a member movable in one of said jaws, and a handle for manual control of said member, said member having means for engaging said head to retract the latter against the effort of the impelling means aforesaid and said handle being operable when the jaws are in normal operative position.

4. A chuck having jaws movable diametrically thereof, heads mounted in said jaws, one of said heads being non-yieldingly mounted in one of said jaws, and another of said heads being yieldingly mounted in another of said jaws, the non-yieldingly mounted head moving positively outward with its jaw and the yieldingly mounted head moving inward in corresponding degree, when the said jaws are opened, and separate means for moving the yieldingly mounted head away from the work.

5. A chuck having jaws movable diametrically thereof, a pair of heads swiveled in said jaws on an axis parallel with the movement of said jaws, a spring within one of said heads for impelling it inward independently of its supporting jaw, and a rock-shaft having means for engaging said head to retract the same.

6. A chuck having jaws movable diametrically thereof, a pair of heads swiveled in said jaws on an axis parallel with the movement of said jaws, a spring within one of said heads for impelling it inward independently of its supporting jaw, a rock-shaft having means for engaging said head to retract the same, and a pin in said jaw for fixing the position of said head when the latter is retracted against the jaw.

7. A chuck having jaws movable diametrically thereof, a pair of heads swiveled in said jaws on an axis parallel with the movement of said jaws, a spring within one of said heads for impelling it inward independently of its supporting jaw, a rock-shaft having means for engaging said head to retract the same, and a pin having a tapered end and slightly movable in said jaw and coöperating with said head to fix the position of the latter when retracted against the jaw, said pin serving as a click or detent when the head is projected from the jaw.

8. A chuck having jaws movable diametrically thereof, a pair of heads swiveled in said jaws, means within one of said heads for impelling it inward independently of its supporting jaw, and a rock shaft having means for engaging said head to retract the same.

In witness whereof, I subscribe my signature, in the presence of two witnesses.

EDWARD J. McCLELLAN.

Witnesses:
J. T. WILLIAMS,
CHAS. T. LUTHER.